(12) United States Patent
Albero et al.

(10) Patent No.: US 11,816,231 B2
(45) Date of Patent: Nov. 14, 2023

(54) USING MACHINE-LEARNING MODELS TO DETERMINE GRADUATED LEVELS OF ACCESS TO SECURED DATA FOR REMOTE DEVICES

(71) Applicant: Bank of America Corporation, Charlotte, NC (US)

(72) Inventors: George Albero, Charlotte, NC (US); Maharaj Mukherjee, Poughkeepsie, NY (US); Deborah Mayers, Charlotte, NC (US); Jinna Kim, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 221 days.

(21) Appl. No.: 17/532,002

(22) Filed: Nov. 22, 2021

(65) Prior Publication Data

US 2023/0161887 A1 May 25, 2023

(51) Int. Cl.
*G06F 21/60* (2013.01)
*G06F 21/53* (2013.01)
*G06F 21/31* (2013.01)

(52) U.S. Cl.
CPC ............ *G06F 21/604* (2013.01); *G06F 21/31* (2013.01); *G06F 21/53* (2013.01); *G06F 21/606* (2013.01); *G06F 2221/2113* (2013.01)

(58) Field of Classification Search
CPC ........ G06F 21/604; G06F 21/31; G06F 21/53; G06F 21/606; G06F 2221/2113
See application file for complete search history.

(56) References Cited

U.S. PATENT DOCUMENTS

| | | |
|---|---|---|
| 11,164,109 B2 | 11/2021 | Browne et al. |
| 11,164,378 B1 | 11/2021 | Cowen et al. |
| 11,165,842 B2 | 11/2021 | Gurtowski |
| 11,169,511 B2 | 11/2021 | Cella et al. |
| 11,169,651 B2 | 11/2021 | Nixon et al. |
| 11,169,980 B1 | 11/2021 | Revach et al. |
| 11,170,214 B2 | 11/2021 | Alexander et al. |
| 11,170,224 B2 | 11/2021 | Cambias et al. |
| 11,170,577 B2 | 11/2021 | Seiler et al. |
| 11,171,926 B2 | 11/2021 | Azulay et al. |
| 11,172,990 B2 | 11/2021 | Lang |
| 11,175,642 B2 | 11/2021 | Cella et al. |

(Continued)

*Primary Examiner* — Thaddeus J Plecha
(74) *Attorney, Agent, or Firm* — Banner & Witcoff, Ltd.

(57) ABSTRACT

Aspects of the disclosure relate to using machine-learning models to determine graduated levels of access to secured data for remote devices. In some embodiments, a computing platform may establish a connection with a mobile device. Subsequently, based on establishing the connection, the platform may identify initial device information, device features, and user information. The platform may input the identified information into an authentication model to compute a baseline authentication score and then may identify an initial level of access to secured resources for the mobile device. Thereafter, the platform may receive from the mobile device, AR/VR device information captured by the mobile device. The platform may input the AR/VR device information into the authentication model to compute an augmented authentication score. Based on the augmented score, the platform may identify an augmented level of access to secured resources for the mobile device.

20 Claims, 13 Drawing Sheets

(56) References Cited

U.S. PATENT DOCUMENTS

| | | |
|---|---|---|
| 11,175,653 B2 | 11/2021 | Cella et al. |
| 11,175,731 B1 | 11/2021 | Whitmire et al. |
| 11,175,803 B2 | 11/2021 | Kline et al. |
| 11,176,423 B2 | 11/2021 | Desai et al. |
| 11,176,756 B1 | 11/2021 | Bar-Zeev et al. |
| 11,178,088 B1 | 11/2021 | Weiss et al. |
| 11,178,096 B1 | 11/2021 | Kimhi et al. |
| 11,178,251 B2 | 11/2021 | Sullivan et al. |
| 11,178,360 B1 | 11/2021 | Goetzinger |
| 2015/0052587 A1* | 2/2015 | O'Neill .................. G06F 21/33 726/4 |
| 2020/0001826 A1* | 1/2020 | Oh ........................ B60R 25/241 |
| 2020/0099807 A1* | 3/2020 | Sakaida ............. H04N 1/00514 |
| 2021/0335032 A1 | 10/2021 | Ara Jo et al. |
| 2021/0339143 A1 | 11/2021 | Bar-Zeev et al. |
| 2021/0339708 A1 | 11/2021 | Dumov |
| 2021/0341993 A1 | 11/2021 | Bastide et al. |
| 2021/0342114 A1 | 11/2021 | Mann et al. |
| 2021/0342836 A1 | 11/2021 | Cella et al. |
| 2021/0344635 A1 | 11/2021 | Vukich et al. |
| 2021/0344795 A1 | 11/2021 | Kats et al. |
| 2021/0344991 A1 | 11/2021 | Todd |
| 2021/0345879 A1 | 11/2021 | Mason et al. |
| 2021/0348886 A1 | 11/2021 | Havens et al. |
| 2021/0349983 A1* | 11/2021 | Naganna ............ G02B 27/0172 |
| 2021/0350488 A1 | 11/2021 | Hossain |
| 2021/0350926 A1 | 11/2021 | Mason et al. |
| 2021/0352371 A1 | 11/2021 | Ortiz et al. |
| 2021/0352590 A1 | 11/2021 | Marsh et al. |
| 2021/0357850 A1 | 11/2021 | Cella et al. |
| 2021/0357959 A1 | 11/2021 | Cella et al. |
| 2021/0359996 A1 | 11/2021 | Brown et al. |
| 2021/0360066 A1 | 11/2021 | Karumbunathan et al. |

* cited by examiner

USING MACHINE-LEARNING MODELS TO DETERMINE GRADUATED LEVELS OF ACCESS TO SECURED DATA FOR REMOTE DEVICES

BACKGROUND

Aspects of the disclosure relate to deploying digital data processing systems, ensuring information security, and preventing unauthorized access to secure information resources. In particular, one or more aspects of the disclosure relate to using machine-learning models to determine graduated levels of access to secured data for remote devices.

Enterprise organizations may utilize various computing infrastructure to maintain confidential information and/or other sensitive data that is created and/or used for various purposes. Ensuring that this data is secure and only accessible to appropriate users for appropriate purposes may be critically important to protecting the integrity and confidentiality of the underlying information and associated resources. In many instances, it may be difficult to ensure the security and integrity of enterprise-managed information and resources, particularly when providing remote devices, and specifically augmented reality/virtual reality (AR/VR) devices, with access to secure enterprise information.

SUMMARY

Aspects of the disclosure provide effective, efficient, scalable, and convenient technical solutions that address and overcome the technical problems associated with ensuring information security and preventing unauthorized access by using machine-learning models to determine graduated levels of access to secured data for remote devices.

In accordance with one or more embodiments, a computing platform having at least one processor, a communication interface, and memory may establish, via the communication interface, a connection with a first end user mobile computing device. Subsequently, based on establishing the connection with the first end user mobile computing device, the computing platform may identify initial device information, device feature information, and user credential validation information. The device feature information may include information specifying augmented reality/virtual reality (AR/VR) capabilities of the first end user mobile computing device. The computing platform may input the initial device information, the device feature information, and the user credential validation information into an authentication model to compute a baseline authentication score. Based on the baseline authentication score computed by the authentication model, the computing platform may identify an initial level of access for the first end user mobile computing device. The computing platform may provide the first end user mobile computing device with access to one or more secured information resources based on the initial level of access identified for the first end user mobile computing device. Thereafter, the computing platform may receive, via the communication interface, from the first end user mobile computing device, AR/VR device information captured by the first end user mobile computing device based on a connection established between the first end user mobile computing device and a first AR/VR device. The computing platform may input the AR/VR device information into the authentication model to compute an augmented authentication score. Based on the augmented authentication score computed by the authentication model, the computing platform may identify a first augmented level of access for the first end user mobile computing device. Then, the computing platform may provide the first end user mobile computing device with access to the one or more secured information resources based on the first augmented level of access identified for the first end user mobile computing device.

In some embodiments, receiving the AR/VR device information captured by the first end user mobile computing device based on the connection established between the first end user mobile computing device and the first AR/VR device may include receiving AR/VR device user data and AR/VR device spatial data.

In some embodiments, the AR/VR device user data may include movement data, facial recognition data, eye tracking data, motion tracking data, or device usage pattern data associated with the first AR/VR device.

In some embodiments, the AR/VR device spatial data may include camera spatial data associated with the first AR/VR device.

In some embodiments, the computing platform may receive, via the communication interface, sandbox information captured by a sandbox system based on a connection between the first end user mobile computing device and the sandbox system. In response to receiving the sandbox information captured by the sandbox system, the computing platform may identify behavioral characteristic information of the first AR/VR device based on operations of the first AR/VR device within the sandbox system. Thereafter, the computing platform may input the behavioral characteristic information of the first AR/VR device into the authentication model to compute a second augmented authentication score. Based on the second augmented authentication score, the computing platform may identify a second augmented level of access for the first end user mobile computing device. Then, the computing platform may provide the first end user mobile computing device with access to the one or more secured information resources based on the second augmented level of access identified for the first end user mobile computing device.

In some embodiments, the sandbox information captured by the sandbox system may contain behavioral information associated with the operations of the first AR/VR device within the sandbox system and other information associated with the first AR/VR device.

In some embodiments, the computing platform may receive, via the communication interface, session data from the first end user mobile computing device. In response to receiving the session data from the first end user mobile computing device, the computing platform may identify session characteristic data based on the session data received from the first end user mobile computing device. Thereafter, the computing platform may input the session characteristic data into the authentication model to compute a third augmented authentication score. Based on the third augmented authentication score, the computing platform may identify a third augmented level of access for the first end user mobile computing device. Then, the computing platform may provide the first end user mobile computing device with access to the one or more secured information resources based on the third augmented level of access identified for the first end user mobile computing device.

In some embodiments, the session data received from the first end user mobile computing device may contain a continuous stream of data.

In some embodiments, the session characteristic data may contain a selected portion of the continuous stream of data.

In some embodiments, after providing the first end user mobile computing device with access to the one or more secured information resources based on the third augmented level of access identified for the first end user mobile computing device, the computing platform may identify that an anomaly exists in the session data received from the first end user mobile computing device. In response to identifying that the anomaly exists in the session data received from the first end user mobile computing device, the computing platform may generate a re-authentication prompt for the first end user mobile computing device. Thereafter, the computing platform may send, via the communication interface, to the first end user mobile computing device, the re-authentication prompt. Sending the re-authentication prompt to the first end user mobile computing device may cause the first end user mobile computing device to display a prompt requesting updated authentication credentials from a user of the first end user mobile computing device. The computing platform may receive, via the communication interface, updated authentication credential information from the first end user mobile computing device. Then, the computing platform may validate the updated authentication credential information received from the first end user mobile computing device using the authentication model. Validating the updated authentication credential information received from the first end user mobile computing device may produce a fourth augmented authentication score. Based on the fourth augmented authentication score, the computing platform may identify a fourth augmented level of access for the first end user mobile computing device. Then, the computing platform may provide the first end user mobile computing device with access to the one or more secured information resources based on the fourth augmented level of access identified for the first end user mobile computing device.

In some embodiments, the computing platform may receive, via the communication interface, a distress signal from the first end user mobile computing device. In response to receiving the distress signal from the first end user mobile computing device, the computing platform may identify that continued access to the one or more secured information resources should be prevented. In response to identifying that continued access to the one or more secured information resources should be prevented, the computing platform may terminate a connection with the first end user mobile computing device.

In some embodiments, in response to identifying that continued access to the one or more secured information resources should be prevented, the computing platform may update the authentication model based on one or more features of interactions with the first end user mobile computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2I depict an illustrative event sequence for using machine-learning models to determine graduated levels of access to secured data for remote devices in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
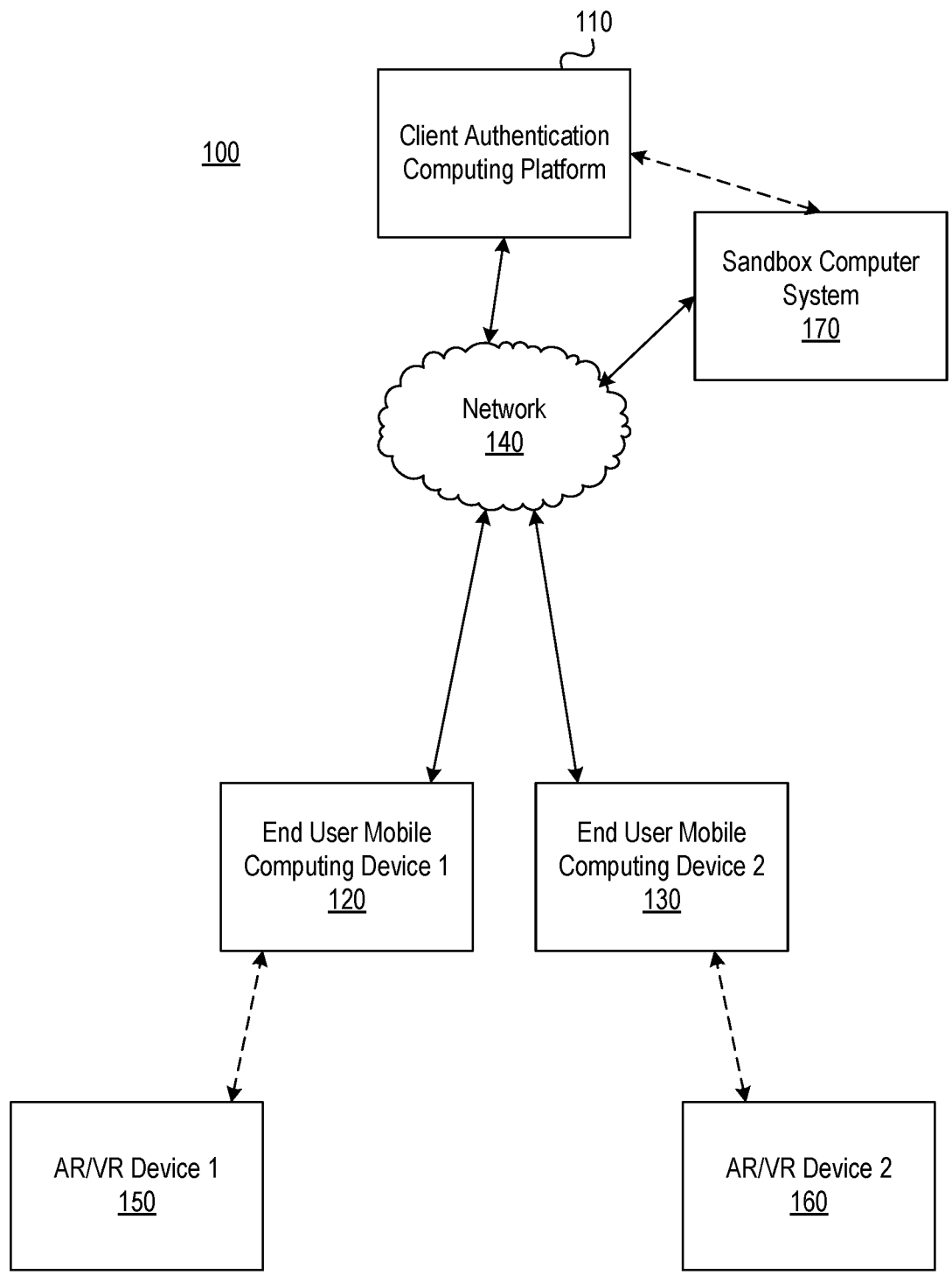
FIGS. 1A and 1B depict an illustrative computing environment for using machine-learning models to determine graduated levels of access to secured data for remote devices in accordance with one or more example embodiments.
Figure 1B:
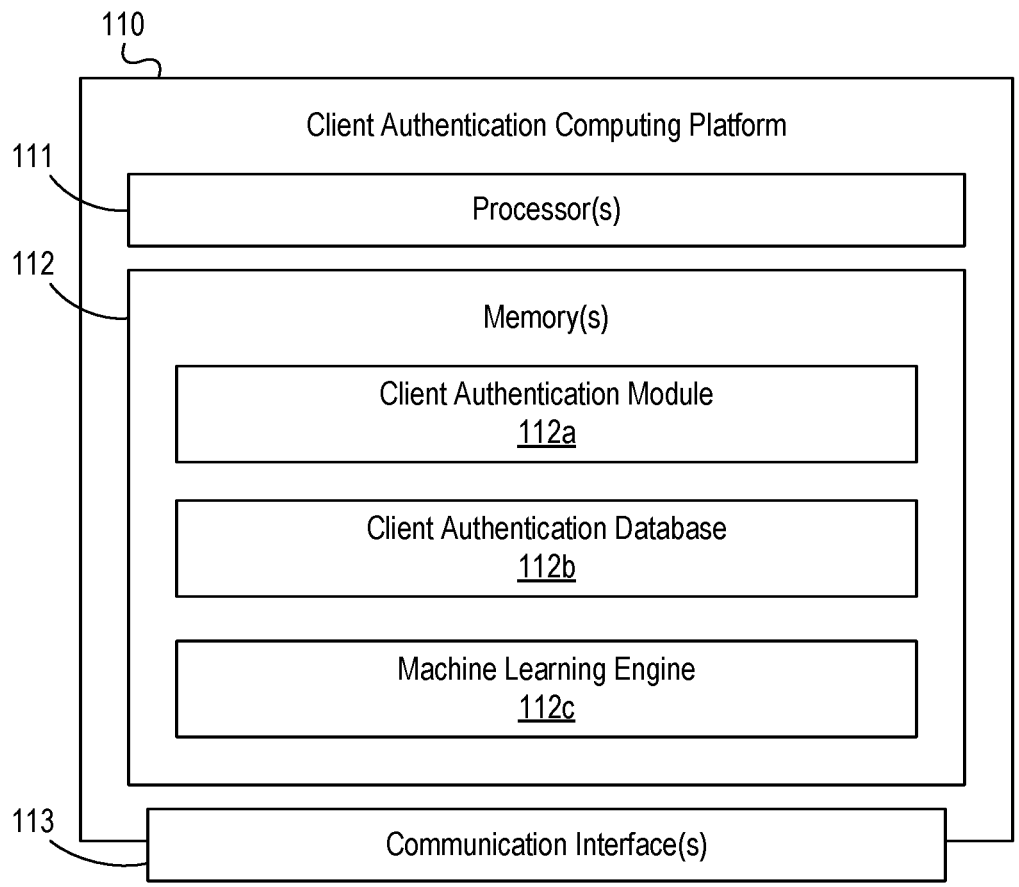

FIGS. 1A and 1B depict an illustrative computing environment for using machine-learning models to determine graduated levels of access to secured data for remote devices in accordance with one or more example embodiments. Referring to FIG. 1A, computing environment 100 may include one or more computer systems. For example, computing environment 100 may include a client authentication computing platform 110, a first end user mobile computing device 120, a second end user mobile computing device 130, a network 140, a first AR/VR device 150, a second AR/VR device 160, and a sandbox computer system 170.

As illustrated in greater detail below, client authentication computing platform 110 may include one or more computing devices configured to perform one or more of the functions described herein. For example, client authentication computing platform 110 may include one or more computers (e.g., laptop computers, desktop computers, servers, server blades, or the like).

End user mobile computing device 120 may be a mobile computing device (e.g., smartphone, tablet, smart watch, laptop computer, or the like). In addition, end user mobile computing device 120 may be linked to and/or used by a first user (who may, e.g., be a customer or other individual). In addition, and as illustrated in greater detail below, end user mobile computing device 120 may be configured to receive information from, send information to, and/or otherwise exchange information with one or more devices that are used by the first user.

End user mobile computing device 130 also may be a mobile computing device (e.g., smartphone, tablet, smart watch, laptop computer, or the like). In addition, end user mobile computing device 130 may be linked to and/or used by a second user (who may, e.g., be a customer or other individual) different from the first user. In addition, and as illustrated in greater detail below, end user mobile computing device 130 may be configured to receive information from, send information to, and/or otherwise exchange information with one or more devices that are used by the second user.

AR/VR device 150 may be an augmented reality or virtual reality computing device (e.g., smartphone, tablet, headset, smart glasses, or the like). In addition, AR/VR device 150 may be linked to and/or used by the first user of the end user mobile computing device 120. AR/VR device 160 also may be an augmented reality or virtual reality computing device (e.g., smartphone, tablet, headset, smart glasses, or the like). In addition, AR/VR device 160 may be linked to and/or used by the second user of the end user mobile computing device 130.

Sandbox computer system 170 may include one or more computing devices configured to perform one or more of the functions described herein. For example, sandbox computer system 170 may include one or more computers (e.g., laptop computers, desktop computers, servers, server blades, or the like).

Computing environment 100 also may include one or more networks, which may interconnect one or more of client authentication platform 110, end user mobile computing device 120, end user mobile computing device 130, AR/VR device 150, AR/VR device 160, and sandbox computer system 170. For example, computing environment 100 may include a network 140 (which may, e.g., interconnect client authentication platform 110, end user mobile computing device 120, end user mobile computing device 130, sandbox computer system 170, and/or one or more other systems which may be associated with an enterprise organization, such as a financial institution, with one or more other systems, public networks, sub-networks, or the like.

In one or more arrangements, client authentication platform 110, end user mobile computing device 120, end user mobile computing device 130, AR/VR device 150, AR/VR device 160, and sandbox computer system 170 may be any type of computing device capable of receiving a user interface, receiving input via the user interface, and communicating the received input to one or more other computing devices. For example, client authentication platform 110, end user mobile computing device 120, end user mobile computing device 130, AR/VR device 150, AR/VR device 160, sandbox computer system 170, and/or the other systems included in computing environment 100 may, in some instances, include one or more processors, memories, communication interfaces, storage devices, and/or other components. As noted above, and as illustrated in greater detail below, any and/or all of client authentication platform 110, end user mobile computing device 120, end user mobile computing device 130, AR/VR device 150, AR/VR device 160, and sandbox computer system 170 may, in some instances, be special-purpose computing devices configured to perform specific functions.

Referring to FIG. 1B, client authentication platform 110 may include one or more processor(s) 111, memory(s) 112, and communication interface(s) 113. A data bus may interconnect processor 111, memory 112, and communication interface 113. Communication interface 113 may be a network interface configured to support communication between client authentication platform 110 and one or more networks (e.g., network 140 or the like). Memory 112 may include one or more program modules having instructions that when executed by processor 111 cause client authentication computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of client authentication computing platform 110 and/or by different computing devices that may form and/or otherwise make up client authentication platform 110. For example, memory 112 may have, store, and/or include a client authentication module 112a, a client authentication database 112b, and a machine learning engine 112c. Client authentication module 112a may have instructions that direct and/or cause client authentication computing platform 110 to authenticate end user mobile computing devices using machine-learning models to determine graduated levels of access to secured data for remote devices, as discussed in greater detail below. Client authentication database 112b may store information used by client authentication module 112a and/or client authentication computing platform 110 in authentication devices using machine-learning models to determine graduated levels of access to secured data for remote devices. Machine learning engine 112c may have instructions that direct and/or cause client authentication computing platform 110 to compute authentication scores for various end user mobile computing devices (e.g., end user mobile computing device 120, end user mobile computing device 130) and/or other systems.

Figure 2A:
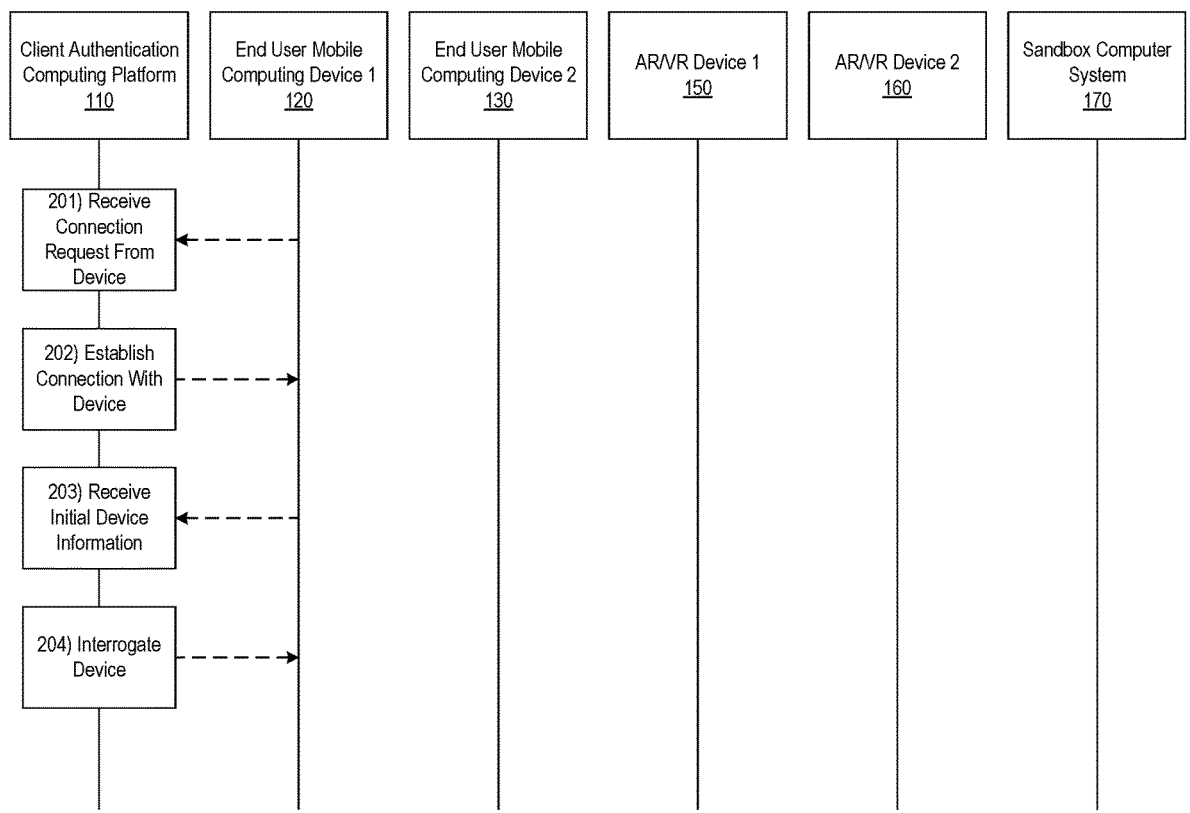

FIGS. 2A-2I depict an illustrative event sequence for authenticating devices using machine-learning models to determine graduated levels of access to secured data for remote devices in accordance with one or more example embodiments. Referring to FIG. 2A, at step 201, client authentication computing platform 110 may receive a connection request from end user mobile computing device 120. For example, at step 201, one or more end user mobile computing device (e.g., end user mobile computing device 120) may request to connect to client authentication computing platform 110 based on a user of the one or more mobile computing devices (e.g., end user mobile computing device 120) attempting to access secured data protected by the client authentication platform 110.

At step 202, client authentication computing platform 110 may establish a connection with the end user mobile computing device 120. For example, at step 202, client authentication computing platform 110 may establish, via a communication interface (e.g., communication interface 113), a connection with one or more mobile computing devices (e.g., end user mobile computing device 120).

At step 203, client authentication computing platform 110 may receive device information from the end user mobile computing device 120. For example, at step 203, client authentication computing platform 110 may receive, via a communication interface (e.g., communication interface 113) device information (e.g., type of device, age of device, device software, or the like) from one or more mobile computing devices (e.g., end user mobile computing device 120). For instance, after establishing a connection between client authentication computing platform 110 and the end user mobile computing device 120, the end user mobile computing device 120 may provide client authentication computing platform 110 with its device information (e.g., type of device, age of device, device software, or the like).

At step 204, client authentication computing platform 110 may interrogate end user mobile computing device 120. For example, at step 204, client authentication computing platform may interrogate, via a communication interface (e.g., communication interface 113), the end user mobile computing device 120 for features of the end user mobile computing device 120. For instance, client authentication computing platform 110 may request to receive the technological features of the end user mobile computing device 120. In response to that request, client authentication computing platform 110 may receive information identifying the technological features of the end user mobile computing device 120. In some embodiments, client authentication computing platform 110 receives the information identifying the technological features of the end user mobile computing device 120 through detection of the technological features (e.g., device manufacturer, device model, device serial number, operating system name, operating system version, network interface identifier(s), or the like). For example, client authentication computing platform 110 may, in response to establishing a connection with the end user mobile computing device 120, detect the technological features of the end user mobile computing device 120.

Figure 2B:
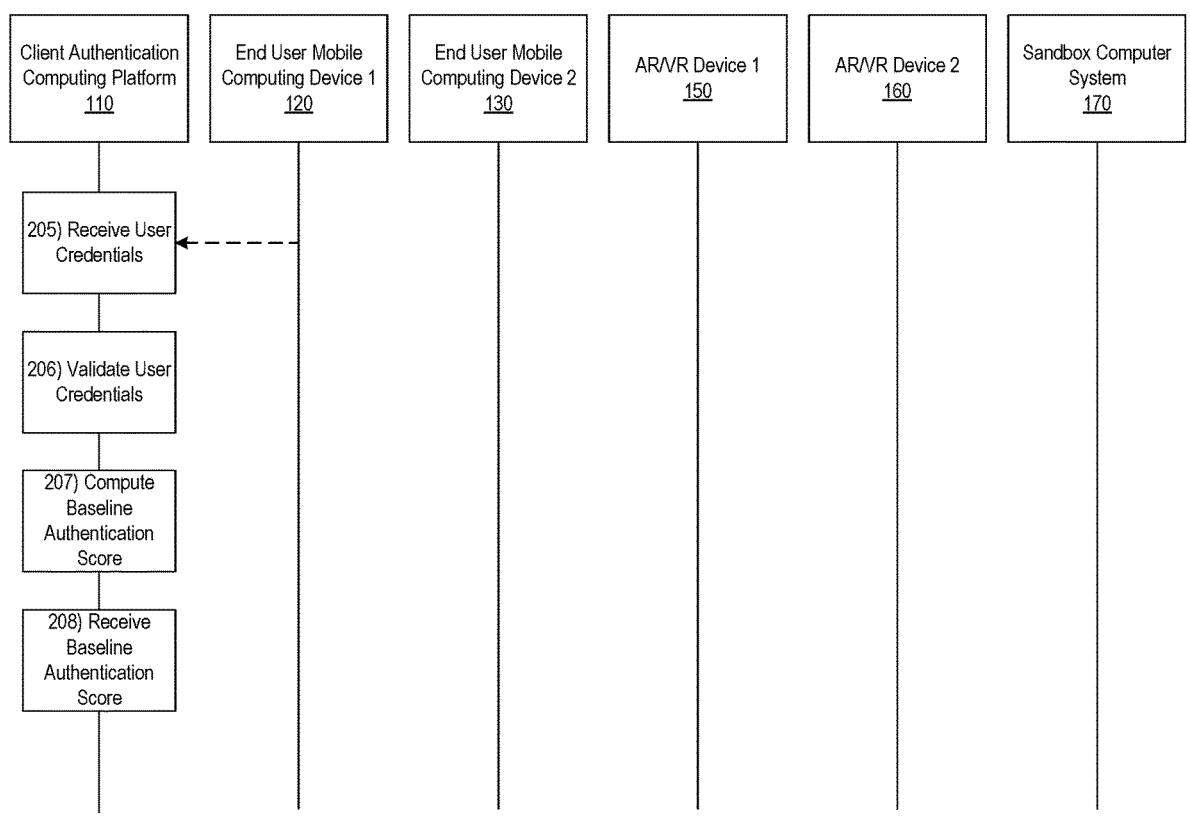

Referring to FIG. 2B, at step 205, client authentication computing platform 110 may receive user credentials from the end user mobile computing device 120. For example, at step 205, client authentication computing platform 110 may receive, via a communication interface (e.g., communication interface 113), user credentials (e.g., login information, username, password, PIN, or the like) from the end user mobile computing device 120. For instance, in response to establishing a connection with the end user mobile computing device 120, client authentication computing platform 110 may receive user credentials from the end user mobile computing device 120. In some embodiments, the user of end user mobile computing device 120 may enter user credentials into the end user mobile computing device 120 and the user credentials may be stored on the end user mobile computing device 120. In some embodiments, the user may enter user credentials after establishing a connection between the end user mobile computing device 120 and client authentication computing platform 110.

At step 206, client authentication computing platform 110 may validate the user credentials received from the end user mobile computing device 120 to identify validation information. For example, at step 206, client authentication computing platform 110 may validate the received user credentials based on stored user profile data (e.g., from the client authentication database 112b). For instance, client authentication computing platform 110 may compare the received user credentials to stored user profile data within the client authentication database 112b. If the received user credentials match the stored user profile data, then the validation information may indicate the user is validated. If the received user credentials do not match the stored user profiled data, then the user may be asked to re-enter their user credentials and the validation information may indicate the user is not validated.

At step 207, client authentication computing platform 110 may input the end user mobile computing device 120 information from step 203, the end user mobile computing device 120 features from step 204, and the validation information from step 205 into the client authentication module 112a to compute a baseline authentication score. For example, at step 207, client authentication computing platform 110 may input the received device information, features, and user validation data into an authentication module (e.g., client authentication module 112a). The client authentication module 112a may then compute a baseline authentication score based on the received device information, features, and user validation data. In some embodiments, the client authentication module 112a may also receive information from the client authentication database 112b and may also use that information in computing the baseline authentication score.

At step 208, client authentication computing platform 110 may receive the baseline authentication score from the client authentication module 112a. For example, at step 208, client authentication computing platform 110 may receive the baseline authentication score from an authentication module (e.g., client authentication module 112a).

Figure 2C:
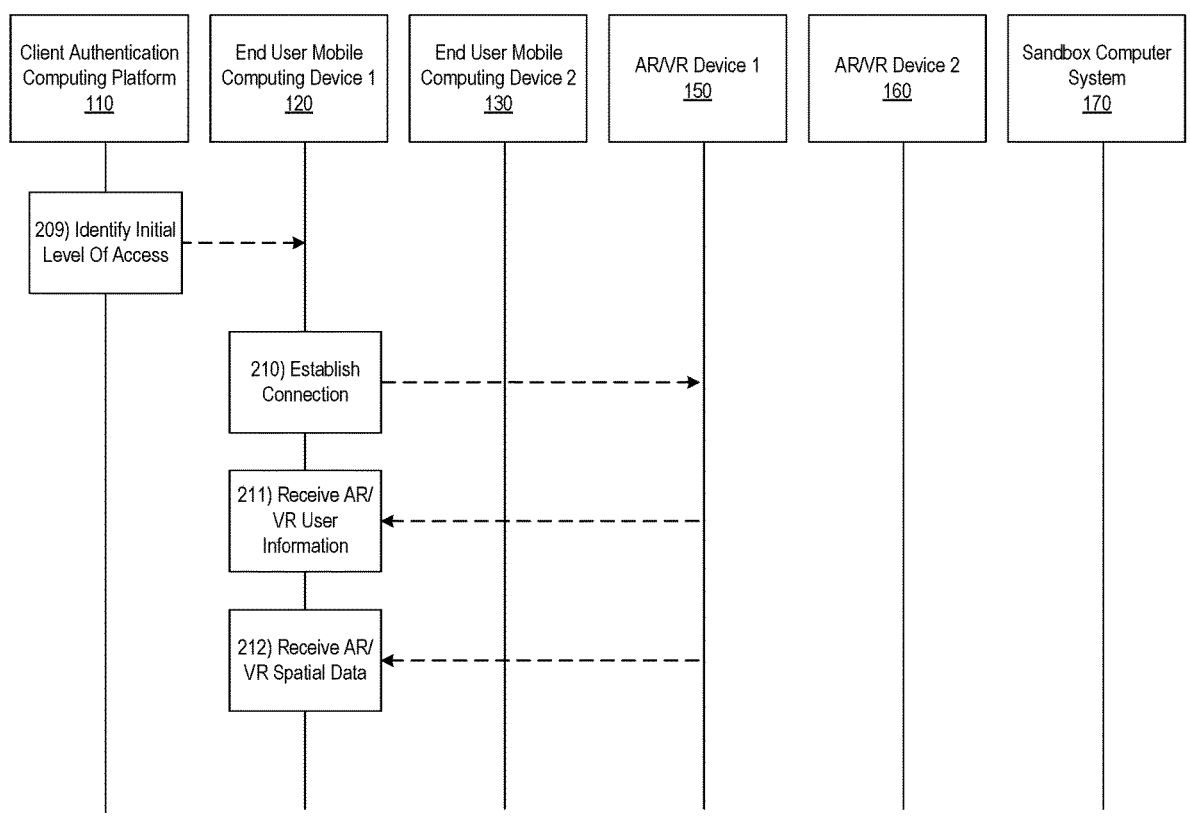

Referring to FIG. 2C, at step 209, client authentication computing platform 110 may identify an initial level of access based on the received baseline authentication score. For example, at step 209, client authentication computing platform 110 may identify one or more levels of access for the end user mobile computing device 120 based on the received baseline authentication score from client authentication module 112a. In some embodiments, client authentication computing platform 110 may input the received baseline authentication score into a machine-learning platform (e.g., machine learning engine 112c). The machine-learning platform may then determine the one or more levels of access based on the received baseline authentication score. In some embodiments, machine learning engine 112c may also use previous authentication information in determining the one or more levels of access.

Figure 3:
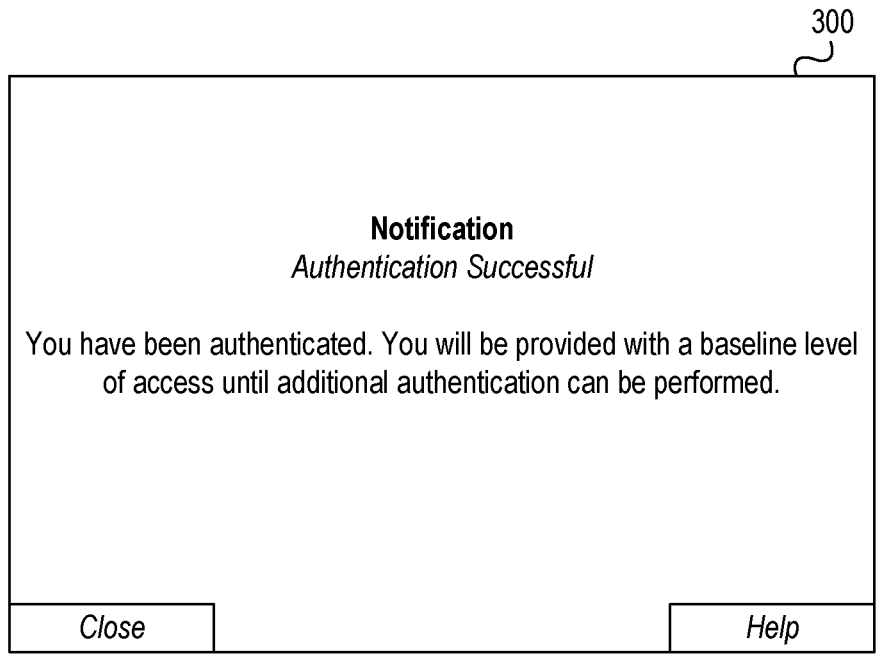
FIGS. 3-4 depict example graphical user interfaces for using machine-learning models to determine graduated levels of access to secured data for remote devices in accordance with one or more example embodiments.

In some embodiments, if the determined level of access is greater than a first minimum level of access, client authentication computing platform 110 may generate and/or send an alert to end user mobile computing device 120 indicating successful authentication. An example of a graphical user interface that may be presented based on such an alert is illustrated in FIG. 3. As seen in FIG. 3, graphical user interface 300 may include text and/or other information indication a successful initial authentication by the client authentication module 112a (e.g., □You have been authenticated. You will be provided with a baseline level of access until additional authentication can be performed.□) as well as one or more user-selectable controls allowing the user of the end user mobile computing device 120 to clear the message (e.g., □Close□ and □Help□). In some embodiments, after a successful initial authentication, the end user mobile computing device 120 may have an initial level of access to secured data.

In some embodiments, if the determined level of access is less than a minimum level of access, client authentication computing platform 110 may generate and/or send an alert to end user mobile computing device 120 indicating unsuccessful authentication. For example, client authentication computing device 110 may request device information, features, and/or user credentials be re-sent from end user mobile computing device 120. In some embodiments, client authentication computing device 110 may request additional device information, features, and/or user credentials. The end user mobile computing device 120 might not have access to secured data in these instances.

At step 210, end user mobile computing device 120 may establish a connection with an AR/VR device 150. For example, at step 210, end user mobile computing device may establish a connection with one or more AR/VR devices (e.g., AR/VR device 150).

At step 211, end user mobile computing device 120 may receive AR/VR user information from the AR/VR device 150. For example, at step 211, end user mobile computing device 120 may receive one or more types of user information (e.g., movement data, facial recognition data, eye tracking data, motion tracking data, device usage patterns, or the like) from the connected AR/VR device 150. In some embodiments, this user information is based on a user profile on the AR/VR device. In some embodiments, this user information and/or user profile is based on the user's previous use of AR/VR device 150. In some embodiments, the user information received by end user mobile computing device 120 is a user profile generated by AR/VR device 150.

At step 212, end user mobile computing device 120 may receive spatial data from AR/VR device 150. For example, at step 212, end user mobile computing device 120 may receive one or more types of spatial data (e.g., AR/VR camera spatial data or the like) from the connected AR/VR device 150. In some embodiments, the spatial data may be the real-time spatial information around the device. In some embodiments, the spatial data may be a spatial data profile created by the AR/VR device 150. The spatial data profile may be a comparison of current spatial data to previous spatial data when the current user used the AR/VR device 150.

Figure 2D:
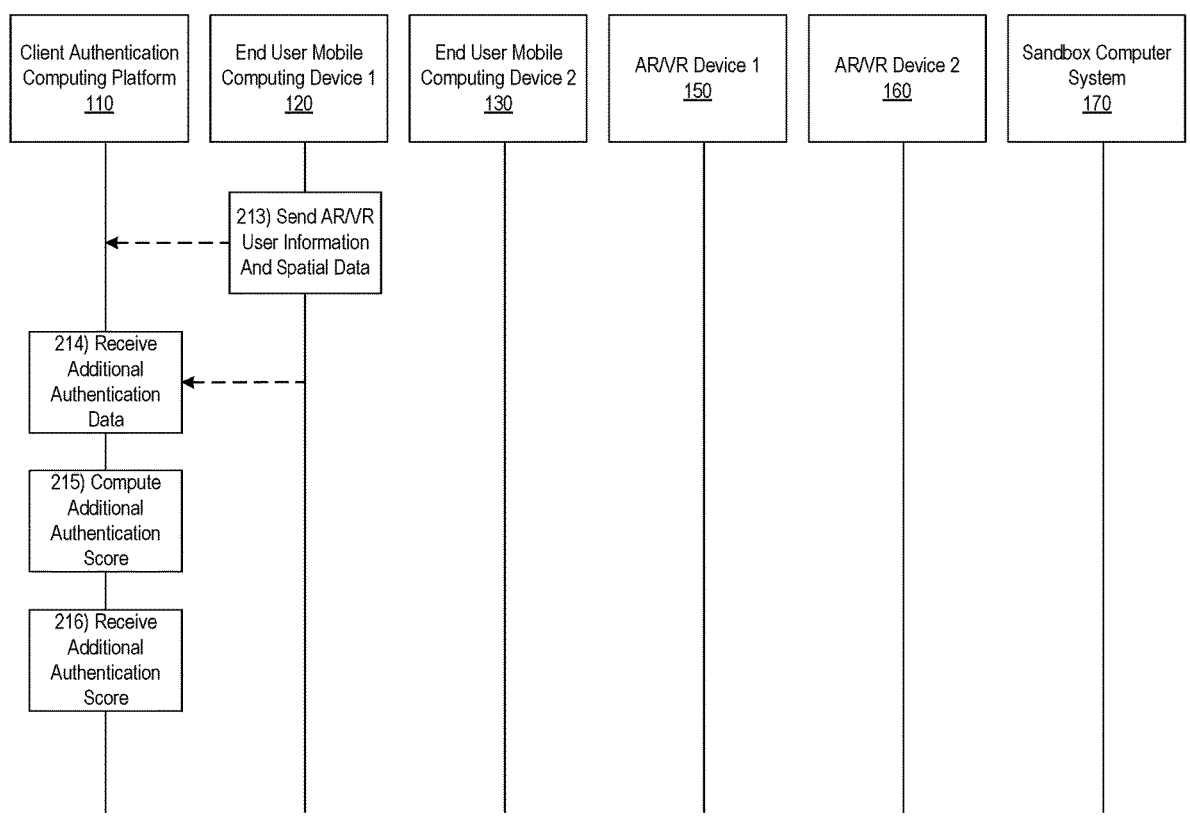

Referring to FIG. 2D, at step 213, end user mobile computing device 120 may send the received AR/VR user information and/or AR/VR spatial data to client authentication computing platform 110. For example, at step 213, end user mobile computing device 120 may, after receiving AR/VR user information and/or spatial data from one or more AR/VR connected devices (e.g., AR/VR device 150), send the AR/VR user information and/or spatial data to client authentication computing platform 110.

At step 214, client authentication computing platform 110 may receive additional authentication information from end user mobile computing device 120. For example, at step 214, client authentication computing platform 110 may receive additional authentication information (e.g., AR/VR user information, AR/VR spatial data, or the like) from end user mobile computing device 120.

At step 215, client authentication computing platform 110 may input the additional authentication information into the client authentication module 112a to compute an additional authentication score. For example, at step 215, client authentication computing platform 110 may input the additional authentication information, received from the one or more connected end user mobile computing devices (e.g., end user mobile computing device 120), into an authentication module (e.g., client authentication module 112a). The client authentication module 112a may then compute an additional authentication score based on the received additional authentication information. In some embodiments, the client authentication module 112a may also receive information from the client authentication database 112b and may also use that information in computing the additional authentication score.

At step 216, client authentication computing platform 110 may receive the additional authentication score from the client authentication module 112a. For example, at step 216, client authentication computing platform 110 may receive the additional authentication score from an authentication module (e.g., client authentication module 112a).

Figure 2E:
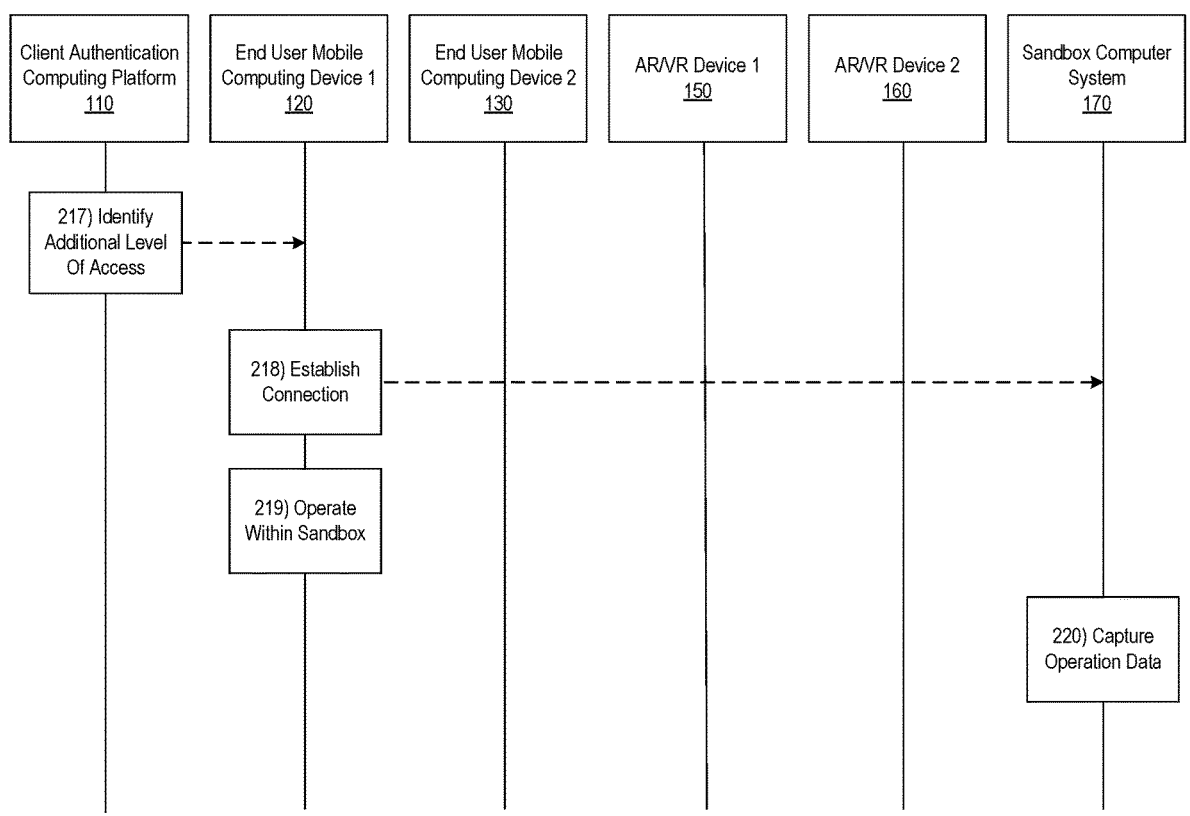

Referring to FIG. 2E, at step 217, client authentication computing platform 110 may identify an additional level of access based on the received additional authentication score. For example, at step 217, client authentication computing platform 110 may identify one or more levels of access for the end user mobile computing device 120 based on the received additional authentication score from client authentication module 112a. In some embodiments, client authentication computing platform 110 may input the received additional authentication score into a machine-learning platform (e.g., machine learning engine 112c). The machine-learning platform may then determine the one or more levels of access based on the received additional authentication score. In some embodiments, machine learning engine 112c may also use previous authentication information in determining the one or more levels of access.

Figure 4:

In some embodiments, if the determined level of access is greater than a second minimum level of access, client authentication computing platform 110 may generate and/or send an alert to end user mobile computing device 120 indicating successful additional authentication. An example of a graphical user interface that may be presented based on such an alert is illustrated in FIG. 4. As seen in FIG. 4, graphical user interface 400 may include text and/or other information indication a successful additional authentication by the client authentication module 112a (e.g., ☐You have been further authenticated. You will now be provided with a higher level of access. Continued monitoring of your activity will continue.☐) as well as one or more user-selectable controls allowing the user of the end user mobile computing device 120 to clear the message (e.g., ☐Close☐ and ☐Help☐). In some embodiments, after a successful additional authentication, the end user mobile computing device 120 may have an additional level of access to secured data.

At step 218, end user mobile computing device 120 may connect to sandbox computer system 170. For example, at step 218, end user mobile computing device 120 connects to a sandbox computing platform (e.g., sandbox computer system 170). In some embodiments, this connection may be established at the direction of client authentication computing platform 110. In some embodiments, based on the computed authentication score (e.g., baseline authentication score, additional authentication score, or the like), client authentication computing platform 110 may require the connected end user mobile computing device 120 to connect with sandbox computer system 170 before granting access to secured resources.

At step 219, end user mobile computing device 120 may operate within sandbox computer system 170. For example, at step 219, end user mobile computing device 120 may operate through the connected sandbox computing platform (e.g., sandbox computer system 170). For instance, end user mobile computing device 120 may operate (e.g., interact with AR/VR objects and/or environment hosted by the sandbox computing platform) as if it is connected to one or more secured data systems, based on its level of access to secured data. However, end user mobile computing device may be operating only within the connected sandbox computer system 170 and might not be connected to secured data systems. In some embodiments, the sandbox computer system 170 is a secured clone of the secured data systems. In some embodiments, sandbox computer system 170 does not allow access to the secured data for the end user mobile computing device 120.

At step 220, sandbox computer system 170 may monitor and capture operation data from end user mobile computing device 120 as it operates within sandbox computer system 170. For example, at step 220, sandbox computer system 170 may continuously monitor and capture data (e.g., behavioral data) from end user mobile computing device 120 as it operates within a sandbox computing platform (e.g., sandbox computer system). In some embodiments, sandbox computer system 170 may capture all data requests made by end user mobile computing device 120 as it operates within sandbox computer system 170.

Figure 2F:
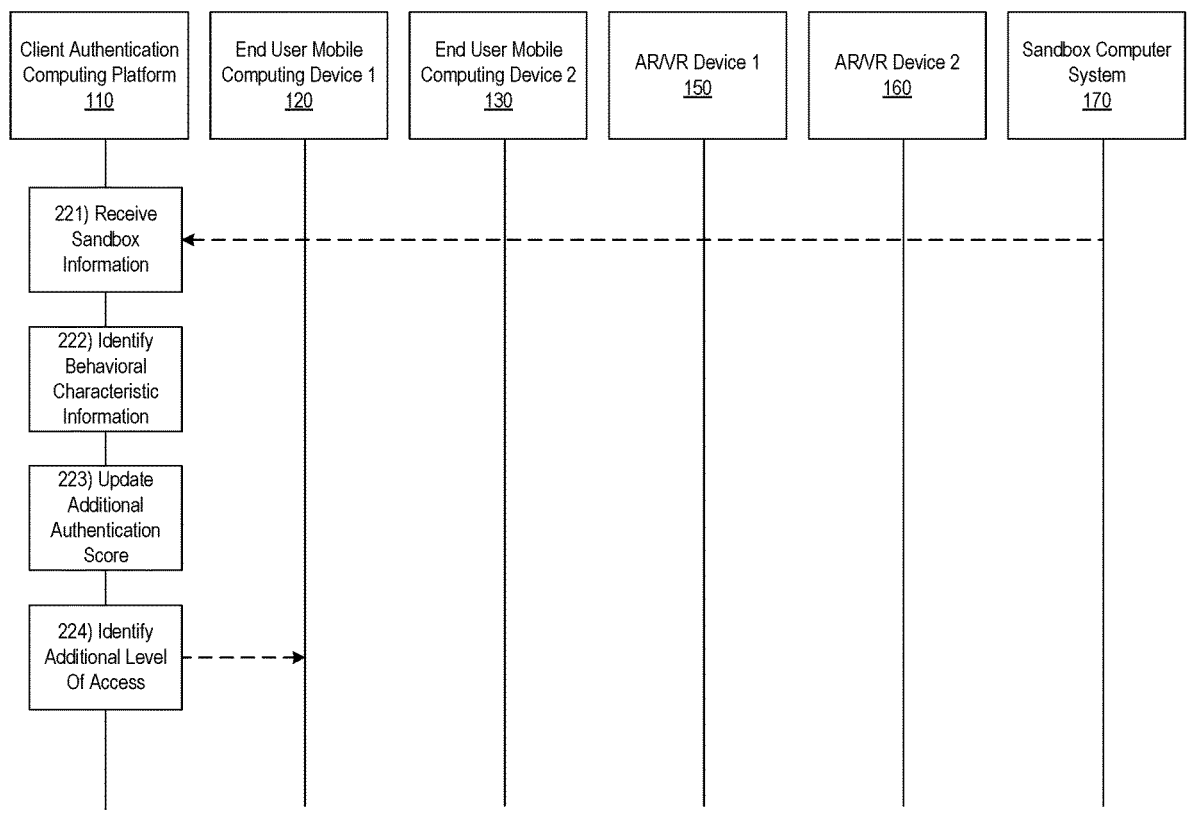

Referring to FIG. 2F, at step 221, client authentication computing platform 110 may receive sandbox monitoring information from sandbox computer system 170. For example, at step 221, client authentication computing platform 110 may receive monitoring information related to connected end user mobile computing device 120 from a connected sandbox computing platform (e.g., sandbox computer system 170). In some embodiments, client authentication computing platform 110 may receive a continuous stream of captured behavior data from sandbox computer system 170.

At step 222, client authentication computing platform 110 may identify behavior characteristic information of end user mobile computing device 120. For example, at step 222, client authentication computing platform 110 may identify behavior characteristic information of the one or more connected mobile computing devices (e.g., end user mobile computing device 120). For instance, client authentication computing platform 110 may identify behavior characteristic information based on the sandbox monitoring information received from the connected sandbox computing platform (e.g., sandbox computer system 170). In some embodiments, client authentication computing platform 110 may identify behavior characteristic information by comparing received sandbox monitoring information to stored data in an authentication database (e.g., client authentication database 112b).

At step 223, client authentication computing platform 110 may input the behavior characteristic information into the client authentication module 112a to compute an updated additional authentication score. For example, at step 223, client authentication computing platform 110 may input the behavior characteristic information, received from the one or more connected end user mobile computing devices (e.g., end user mobile computing device 120), into an authentication module (e.g., client authentication module 112a). The client authentication module 112a may then compute an updated additional authentication score based on the received behavior characteristic information. In some embodiments, the client authentication module 112a may also receive information from the client authentication database 112b and may also use that information in computing the additional authentication score.

At step 224, client authentication computing platform 110 may identify an additional level of access based on the received updated additional authentication score. For example, at step 224, client authentication computing platform 110 may identify one or more levels of access for the end user mobile computing device 120 based on the received updated additional authentication score from client authentication module 112a. In some embodiments, client authentication computing platform 110 may input the received additional authentication score into a machine-learning platform (e.g., machine learning engine 112c). The machine-learning platform may then determine the one or more levels of access based on the received additional authentication score. In some embodiments, machine learning engine 112c may also use previous authentication information in determining the one or more levels of access.

Figure 2G:
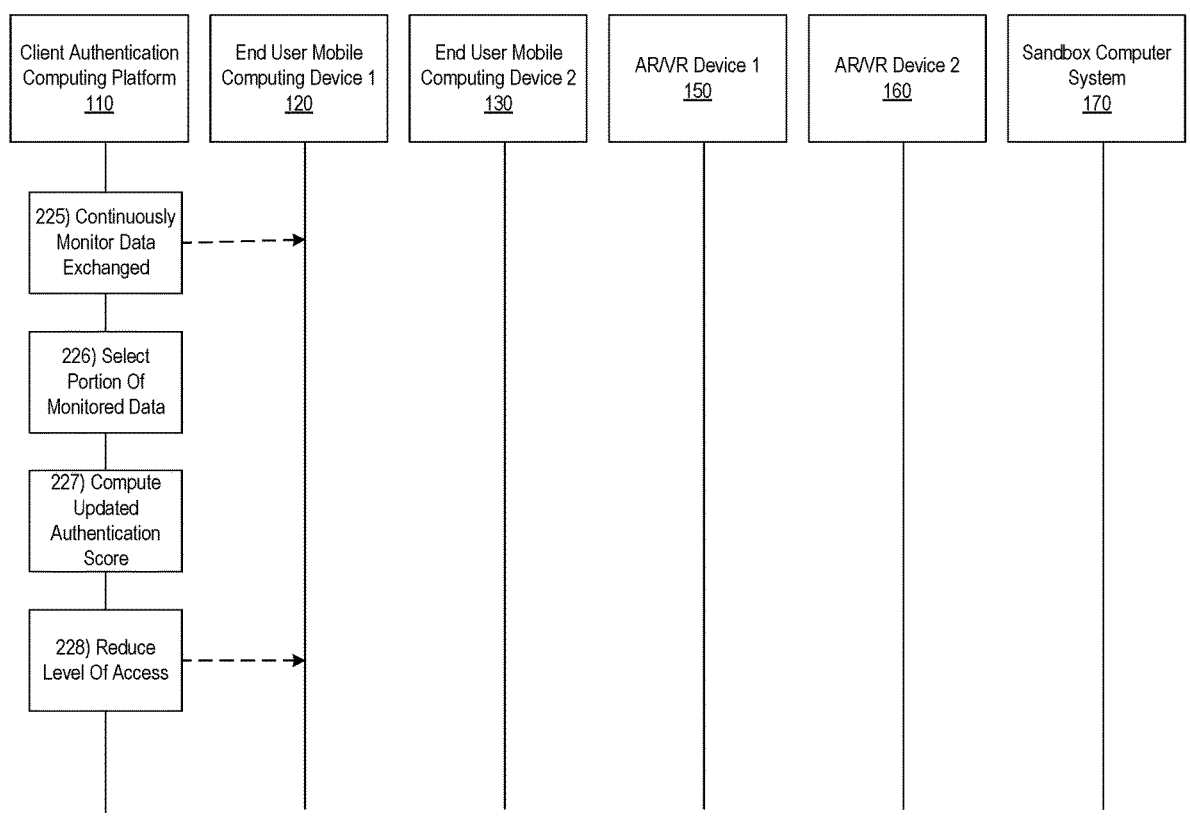

Referring to FIG. 2G, at step 225, client authentication computing platform 110 may monitor data exchanged between end user mobile computing device 120 and client authentication computing platform 110. For example, at step 225, client authentication computing platform 110 may monitor and/or capture data received from one or more connected mobile computing devices (e.g., end user mobile computing device 120). For instance, as the connected end user mobile computing device 120 operates, client authentication computing platform 110 may monitor and/or capture that operation information. In some embodiments, client authentication computing platform 110 continuously monitors and/or captures data exchanged between end user mobile computing device 120 and client authentication computing platform 110.

At step 226, client authentication computing platform 110 may select a portion of the monitored data for analysis. For example, client authentication computing platform 110 may select a portion of the monitored and/or captured data from one or more connected mobile computing devices (e.g., end user mobile computing device 120). In some embodiments, client authentication computing platform 110 may take samples of the monitored and/or captured data. In some embodiments, the portion of the monitored data may include all captured and/or monitored data.

At step 227, client authentication computing platform 110 may input the portion of monitored data into the client authentication module 112a to compute an updated additional authentication score. For example, at step 227, client authentication computing platform 110 may input the portion of monitored data, received by monitoring the one or more connected end user mobile computing devices (e.g., end user mobile computing device 120), into an authentication module (e.g., client authentication module 112a). The client authentication module 112a may then compute an updated additional authentication score based on the portion of the monitored data. In some embodiments, the client authentication module 112a may also receive information from the client authentication database 112b and may also use that information in computing the additional authentication score.

At step 228, client authentication computing platform 110 may identify a lower level of access based on the received updated additional authentication score. For example, at step 228, client authentication computing platform 110 may identify one or more levels of access for the end user mobile computing device 120 based on the received updated additional authentication score from client authentication module 112a. In some embodiments, client authentication computing platform 110 may input the received additional authentication score into a machine-learning platform (e.g., machine learning engine 112c). The machine-learning platform may then determine the one or more levels of access based on the received additional authentication score. In some embodiments, machine learning engine 112c may also use previous authentication information in determining the one or more levels of access.

Figure 2H:
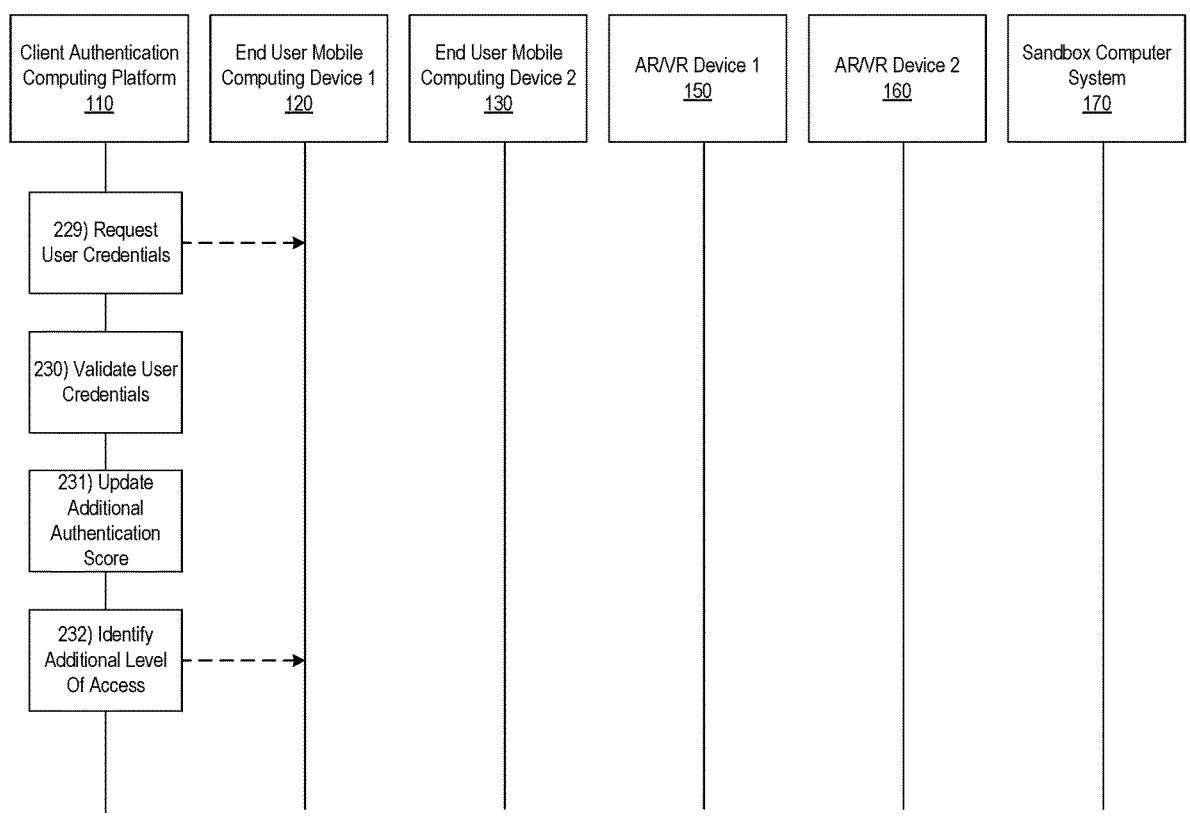
Figure 21:
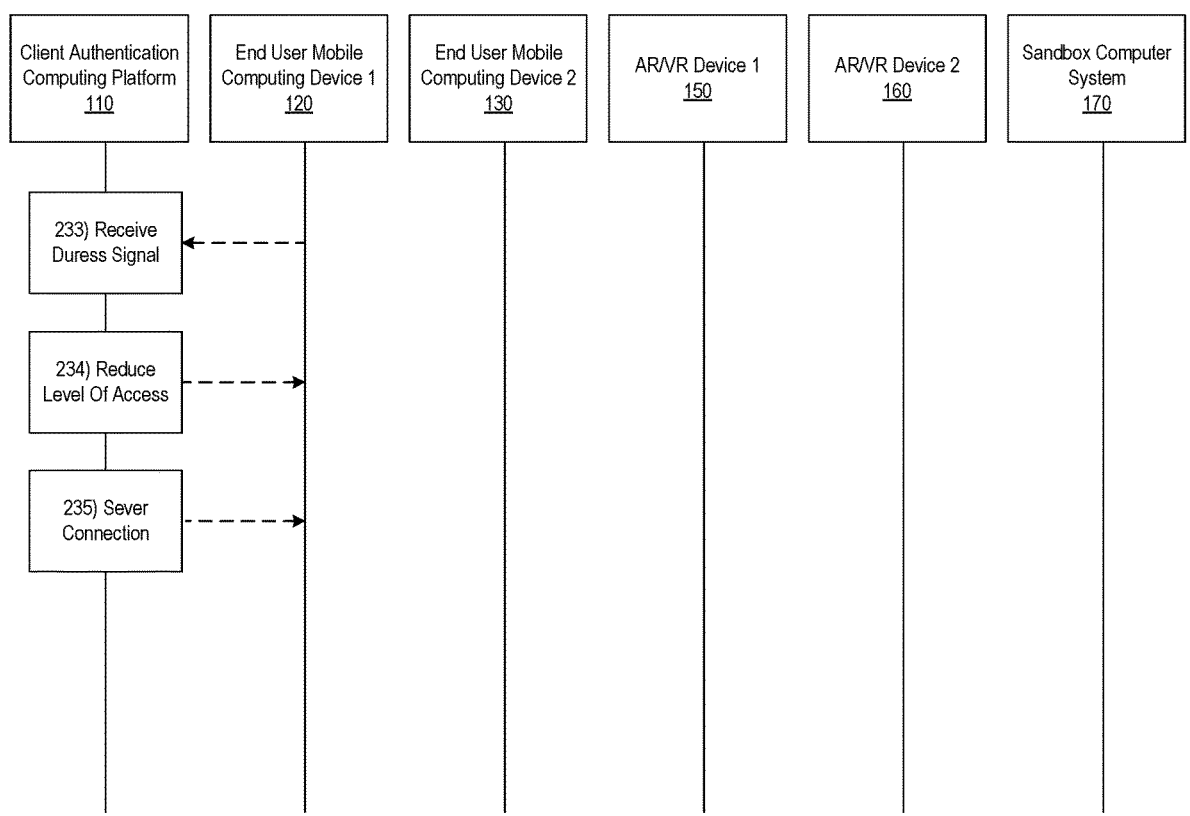

Referring to FIG. 2H, at step 229, client authentication computing platform 110 may request user credentials from end user mobile computing device 120. For example, in step 229, client authentication computing platform 110 may, in response to identifying a lower level of access for the one or more connected mobile computing devices (e.g., end user mobile computing device 120), request user credentials (e.g., login information, username, password, PIN, or the like) from the one or more connected mobile computing devices.

At step 230, client authentication computing platform 110 may validate the user credentials received from the end user mobile computing device 120 to identify validation information. For example, at step 230, client authentication computing platform 110 may validate the received user credentials based on stored user profile data (e.g., from the client authentication database 112b). For instance, client authentication computing platform 110 may compare the received user credentials to stored user profile data within the client authentication database 112b. If the received user credentials match the stored user profile data, then the validation information may indicate the user is validated. If the received user credentials do not match the stored user profiled data, then the user may be asked to re-enter their user credentials and the validation information may indicate the user is not validated.

At step 231, client authentication computing platform 110 may input validation information into the client authentication module 112a to compute an updated additional authentication score. For example, at step 231, client authentication computing platform 110 may input validation information, received by the one or more connected end user mobile computing devices (e.g., end user mobile computing device 120), into an authentication module (e.g., client authentication module 112a). The client authentication module 112a may then compute an updated additional authentication score based on the validation information. In some embodiments, the client authentication module 112a may also receive information from the client authentication database 112b and may also use that information in computing the additional authentication score.

At step 232, client authentication computing platform 110 may identify an additional level of access based on the received updated additional authentication score. For example, at step 232, client authentication computing platform 110 may identify one or more levels of access for the end user mobile computing device 120 based on the received updated additional authentication score from client authentication module 112a. In some embodiments, client authentication computing platform 110 may input the received additional authentication score into a machine-learning platform (e.g., machine learning engine 112c). The machine-learning platform may then determine the one or more levels of access based on the received additional authentication score. In some embodiments, machine learning engine 112c may also use previous authentication information in determining the one or more levels of access. In some embodiments, the additional level of access may be the initial level of access identified for the one or more connected mobile computing devices (e.g., end user mobile computing device 120).

Referring to FIG. 2I, at step 233, client authentication computing platform 110 may receive a distress signal from end user mobile computing device 120. For example, at step 233, client authentication computing platform may receive a signal, from one or more connected mobile computing devices (e.g., end user mobile computing device 120), indicating that the one or more mobile computing devices is being operated under duress. For instance, based on a user of a mobile computing device indicating distress, client authentication computing platform 110 may receive a distress signal from the mobile computing device.

At step 234, client authentication computing platform 110 may identify a lower level of access based on the received distress signal. For example, at step 234, client authentication computing platform 110 may identify one or more levels of access for the one or more connected end user mobile computing device (e.g., end user mobile computing device 120) based on the received distress signal from the one or more connected mobile computing devices. In some embodiments, client authentication computing platform 110 may input the received distress signal into an authentication module (e.g., client authentication module 112a). The authentication module may then determine the one or more levels of access based on the received distress signal. In some embodiments, client authentication computing platform 110 may input the received distress signal into a machine-learning platform (e.g., machine learning engine 112c). The machine-learning platform may then determine the one or more levels of access based on the received distress signal. In some embodiments, machine learning engine 112c may also use previous authentication information in determining the one or more levels of access.

At step 235, client authentication computing platform 110 may sever the connection with end user mobile computing device 120. For example, at step 235, in response to identifying a lower level of access based on the received distress signal, client authentication computing platform 110 may end the connection between client authentication computing platform 110 and the one or more connected mobile computing devices (e.g., end user mobile computing device 120). In some embodiments, client authentication computing platform 110 may reset the identified level of access to the lowest level and/or no access to secured data.

Figure 5:
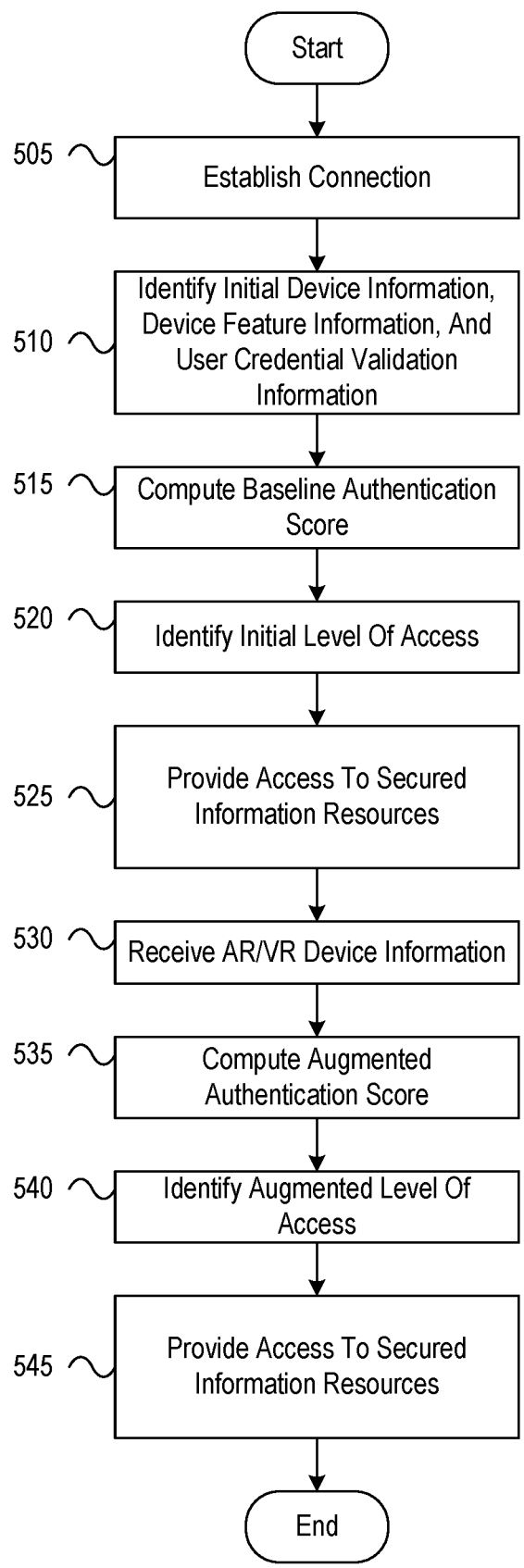
FIG. 5 depicts an illustrative method for using machine-learning models to determine graduated levels of access to secured data for remote devices in accordance with one or more example embodiments.

FIG. 5 depicts an illustrative method for authenticating devices using machine-learning models to determine graduated levels of access to secured data for remote devices in accordance with one or more example embodiments. Referring to FIG. 5, at step 505 a computing platform having at least one processor, a communication interface, and memory, may establish, via the communication interface, a connection with a first end user mobile computing device. At step 510, based on establishing the connection with the first end user mobile computing device, the computing platform may identify initial device information, device feature information, and user credential validation information, where the device feature information comprises information specifying augmented reality/virtual reality (AR/VR) capabilities of the first end user mobile computing device. At step 515, the computing platform may input the initial device information, the device feature information, and the user credential validation information into an authentication model to compute a baseline authentication score. At step 520, based on the baseline authentication score computed by the authentication model, the computing platform may identify an initial level of access for the first end user mobile computing device. At step 525, the computing platform may provide the first end user mobile computing device with access to one or more secured information resources based on the initial level of access identified for the first end user mobile computing device. At step 530, the computing platform may receive, via the communication interface, from the first end user mobile computing device, AR/VR device information captured by the first end user mobile computing device based on a connection established between the first end user mobile computing device and a first AR/VR device. At step 535, the computing platform may input the AR/VR device information into the authentication model to compute an augmented authentication score. At step 540, based on the augmented authentication score computed by the authentication model, the computing platform may identify a first augmented level of access for the first end user mobile computing device. At step 545, the computing platform may provide the first end user mobile computing device with access to the one or more secured information resources based on the first augmented level of access identified for the first end user mobile computing device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, or the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, or the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), or the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, or the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
    at least one processor;
    a communication interface communicatively coupled to the at least one processor; and
    memory storing computer-readable instructions that, when executed by the at least one processor, cause the computing platform to:
        establish, via the communication interface, a connection with a first end user mobile computing device;
        based on establishing the connection with the first end user mobile computing device, identify initial device information, device feature information, and user credential validation information, wherein the device feature information comprises information specifying augmented reality/virtual reality (AR/VR) capabilities of the first end user mobile computing device;
        input the initial device information, the device feature information, and the user credential validation information into an authentication model to compute a baseline authentication score;
        based on the baseline authentication score computed by the authentication model, identify an initial level of access for the first end user mobile computing device;
        provide the first end user mobile computing device with access to one or more secured information resources based on the initial level of access identified for the first end user mobile computing device;
        receive, via the communication interface, from the first end user mobile computing device, AR/VR device information captured by the first end user mobile computing device based on a connection established between the first end user mobile computing device and a first AR/VR device;
        input the AR/VR device information into the authentication model to compute an augmented authentication score;
        based on the augmented authentication score computed by the authentication model, identify a first augmented level of access for the first end user mobile computing device; and
        provide the first end user mobile computing device with access to the one or more secured information resources based on the first augmented level of access identified for the first end user mobile computing device.

2. The computing platform of claim 1, wherein receiving the AR/VR device information captured by the first end user mobile computing device based on the connection established between the first end user mobile computing device and the first AR/VR device comprises receiving AR/VR device user data and AR/VR device spatial data.

3. The computing platform of claim 2, wherein the AR/VR device user data comprises movement data associated with the first AR/VR device, facial recognition data associated with the first AR/VR device, eye tracking data associated with the first AR/VR device, motion tracking data associated with the first AR/VR device, or device usage pattern data associated with the first AR/VR device.

4. The computing platform of claim 2, wherein the AR/VR device spatial data comprises camera spatial data associated with the first AR/VR device.

5. The computing platform of claim 1, wherein the memory stores additional computer-readable instructions that, when executed by the at least one processor, cause the computing platform to:
    receive, via the communication interface, sandbox information captured by a sandbox system based on a connection between the first end user mobile computing device and the sandbox system;

in response to receiving the sandbox information captured by the sandbox system, identify behavioral characteristic information of the first AR/VR device based on operations of the first AR/VR device within the sandbox system;

input the behavioral characteristic information of the first AR/VR device into the authentication model to compute a second augmented authentication score;

based on the second augmented authentication score, identify a second augmented level of access for the first end user mobile computing device; and provide the first end user mobile computing device with access to the one or more secured information resources based on the second augmented level of access identified for the first end user mobile computing device.

6. The computing platform of claim 5, wherein receiving the sandbox information captured by the sandbox system comprises receiving behavioral information associated with the operations of the first AR/VR device within the sandbox system and other information associated with the first AR/VR device.

7. The computing platform of claim 1, wherein the memory stores additional computer-readable instructions that, when executed by the at least one processor, cause the computing platform to:

receive, via the communication interface, session data from the first end user mobile computing device;

in response to receiving the session data from the first end user mobile computing device, identify session characteristic data based on the session data received from the first end user mobile computing device;

input the session characteristic data into the authentication model to compute a third augmented authentication score;

based on the third augmented authentication score, identify a third augmented level of access for the first end user mobile computing device; and provide the first end user mobile computing device with access to the one or more secured information resources based on the third augmented level of access identified for the first end user mobile computing device.

8. The computing platform of claim 7, wherein the session data received from the first end user mobile computing device comprises a continuous stream of data.

9. The computing platform of claim 8, wherein the session characteristic data comprises a selected portion of the continuous stream of data.

10. The computing platform of claim 7, wherein the additional computer-readable instructions that, when executed by the at least one processor, further cause the computing platform to:

after providing the first end user mobile computing device with access to the one or more secured information resources based on the third augmented level of access identified for the first end user mobile computing device, identify that an anomaly exists in the session data received from the first end user mobile computing device;

in response to identifying that the anomaly exists in the session data received from the first end user mobile computing device, generate a re-authentication prompt for the first end user mobile computing device;

send, via the communication interface, to the first end user mobile computing device, the re-authentication prompt, wherein sending the re-authentication prompt to the first end user mobile computing device causes the first end user mobile computing device to display a prompt requesting updated authentication credentials from a user of the first end user mobile computing device;

receive, via the communication interface, updated authentication credential information from the first end user mobile computing device;

validate the updated authentication credential information received from the first end user mobile computing device using the authentication model, wherein validating the updated authentication credential information received from the first end user mobile computing device produces a fourth augmented authentication score;

based on the fourth augmented authentication score, identify a fourth augmented level of access for the first end user mobile computing device; and provide the first end user mobile computing device with access to the one or more secured information resources based on the fourth augmented level of access identified for the first end user mobile computing device.

11. The computing platform of claim 1, wherein the memory stores additional computer-readable instructions that, when executed by the at least one processor, cause the computing platform to:

receive, via the communication interface, a distress signal from the first end user mobile computing device;

in response to receiving the distress signal from the first end user mobile computing device, identify that continued access to the one or more secured information resources should be prevented; and in response to identifying that continued access to the one or more secured information resources should be prevented, terminate a connection with the first end user mobile computing device.

12. The computing platform of claim 11, wherein the memory stores additional computer-readable instructions that, when executed by the at least one processor, cause the computing platform to:

in response to identifying that continued access to the one or more secured information resources should be prevented, update the authentication model based on one or more features of interactions with the first end user mobile computing device.

13. A method, comprising:

at a computing platform comprising at least one processor, a communication interface, and memory:

establishing, by the at least one processor, via the communication interface, a connection with a first end user mobile computing device;

based on establishing the connection with the first end user mobile computing device, identifying, by the at least one processor, initial device information, device feature information, and user credential validation information, wherein the device feature information comprises information specifying augmented reality/virtual reality (AR/VR) capabilities of the first end user mobile computing device;

inputting, by the at least one processor, the initial device information, the device feature information, and the user credential validation information into an authentication model to compute a baseline authentication score;

based on the baseline authentication score computed by the authentication model, identifying, by the at least one processor, an initial level of access for the first end user mobile computing device;
providing, by the at least one processor, the first end user mobile computing device with access to one or more secured information resources based on the initial level of access identified for the first end user mobile computing device;
receiving, by the at least one processor, via the communication interface, from the first end user mobile computing device, AR/VR device information captured by the first end user mobile computing device based on a connection established between the first end user mobile computing device and a first AR/VR device;
inputting, by the at least one processor, the AR/VR device information into the authentication model to compute an augmented authentication score;
based on the augmented authentication score computed by the authentication model, identifying, by the at least one processor, a first augmented level of access for the first end user mobile computing device; and
providing, by the at least one processor, the first end user mobile computing device with access to the one or more secured information resources based on the first augmented level of access identified for the first end user mobile computing device.

14. The method of claim 13, wherein receiving the AR/VR device information captured by the first end user mobile computing device based on the connection established between the first end user mobile computing device and the first AR/VR device comprises receiving AR/VR device user data and AR/VR device spatial data.

15. The method of claim 14, wherein the AR/VR device user data comprises movement data associated with the first AR/VR device, facial recognition data associated with the first AR/VR device, eye tracking data associated with the first AR/VR device, motion tracking data associated with the first AR/VR device, or device usage pattern data associated with the first AR/VR device.

16. The method of claim 14, wherein the AR/VR device spatial data comprises camera spatial data associated with the first AR/VR device.

17. The method of claim 13, comprising:
receiving, by the at least one processor, via the communication interface, sandbox information captured by a sandbox system based on a connection between the first end user mobile computing device and the sandbox system;
in response to receiving the sandbox information captured by the sandbox system, identifying, by the at least one processor, behavioral characteristic information of the first AR/VR device based on operations of the first AR/VR device within the sandbox system;
inputting, by the at least one processor, the behavioral characteristic information of the first AR/VR device into the authentication model to compute a second augmented authentication score;
based on the second augmented authentication score, identifying, by the at least one processor, a second augmented level of access for the first end user mobile computing device; and
providing, by the at least one processor, the first end user mobile computing device with access to the one or more secured information resources based on the second augmented level of access identified for the first end user mobile computing device.

18. The method of claim 17, wherein receiving the sandbox information captured by the sandbox system comprises receiving behavioral information associated with the operations of the first AR/VR device within the sandbox system and other information associated with the first AR/VR device.

19. The method of claim 13, comprising:
receiving, by the at least one processor, via the communication interface, session data from the first end user mobile computing device;
in response to receiving the session data from the first end user mobile computing device, identifying, by the at least one processor, session characteristic data based on the session data received from the first end user mobile computing device;
inputting, by the at least one processor, the session characteristic data into the authentication model to compute a third augmented authentication score;
based on the third augmented authentication score, identifying, by the at least one processor, a third augmented level of access for the first end user mobile computing device; and
providing, by the at least one processor, the first end user mobile computing device with access to the one or more secured information resources based on the third augmented level of access identified for the first end user mobile computing device.

20. One or more non-transitory computer-readable media comprising instructions that, when executed by a computing platform comprising at least one processor, a communication interface, and memory, cause the computing platform to:
establish, via the communication interface, a connection with a first end user mobile computing device;
based on establishing the connection with the first end user mobile computing device, identify initial device information, device feature information, and user credential validation information, wherein the device feature information comprises information specifying augmented reality/virtual reality (AR/VR) capabilities of the first end user mobile computing device;
input the initial device information, the device feature information, and the user credential validation information into an authentication model to compute a baseline authentication score;
based on the baseline authentication score computed by the authentication model, identify an initial level of access for the first end user mobile computing device;
provide the first end user mobile computing device with access to one or more secured information resources based on the initial level of access identified for the first end user mobile computing device;
receive, via the communication interface, from the first end user mobile computing device, AR/VR device information captured by the first end user mobile computing device based on a connection established between the first end user mobile computing device and a first AR/VR device;
input the AR/VR device information into the authentication model to compute an augmented authentication score;
based on the augmented authentication score computed by the authentication model, identify a first augmented level of access for the first end user mobile computing device; and
provide the first end user mobile computing device with access to the one or more secured information resources based on the first augmented level of access identified for the first end user mobile computing device.

\* \* \* \* \*